(12) United States Patent
Wuebbolt-Gorbatenko et al.

(10) Patent No.: US 11,498,379 B2
(45) Date of Patent: Nov. 15, 2022

(54) WHEEL MODULE FOR A MOTOR VEHICLE AND CORRESPONDING MOTOR VEHICLE

(71) Applicant: Schaeffler Technologies AG & Co. KG, Herzogenaurach (DE)

(72) Inventors: Benjamin Wuebbolt-Gorbatenko, Erlangen (DE); Manfred Kraus, Herzogenaurach (DE); Christian Harkort, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/312,034

(22) PCT Filed: Nov. 8, 2019

(86) PCT No.: PCT/DE2019/100964
§ 371 (c)(1),
(2) Date: Jun. 9, 2021

(87) PCT Pub. No.: WO2020/119848
PCT Pub. Date: Jun. 18, 2020

(65) Prior Publication Data
US 2022/0024268 A1 Jan. 27, 2022

(30) Foreign Application Priority Data

Dec. 12, 2018 (DE) ............... 10 2018 131 850.2

(51) Int. Cl.
*B60G 3/14* (2006.01)
*B60G 17/015* (2006.01)
(Continued)

(52) U.S. Cl.
CPC ............. *B60G 3/14* (2013.01); *B60G 17/015* (2013.01); *B60K 7/0007* (2013.01); *B62D 7/18* (2013.01);
(Continued)

(58) Field of Classification Search
CPC .... B60G 3/14; B60G 17/015; B60G 2500/30; B60K 7/0007; B62D 7/18; G05D 1/021
See application file for complete search history.

(56) References Cited

U.S. PATENT DOCUMENTS 6,454,294 B1 * 9/2002 Bittner ................... B60G 99/00
280/678
6,820,887 B1 * 11/2004 Riggle ............... B62D 53/0864
280/490.1

(Continued)

FOREIGN PATENT DOCUMENTS

DE 9412537 U1 10/1994
DE 19634897 C1 9/1997
(Continued)

*Primary Examiner* — Toan C To

(57) ABSTRACT

A wheel module (10) for a motor vehicle includes a wheel (12) and a wheel guide (14) for guiding the wheel (12). The wheel guide (14) includes a wheel carrier unit (16) for supporting the wheel (12); a wheel fork (24) supporting the wheel carrier unit (16); a steering actuator (18) for adjusting the steering angle of the wheel (12); a spring-damper unit (28); and a level adjustment unit (36) for adjusting the height of the vehicle body (32) of the motor vehicle. The spring-damper unit (28) is arranged in a region of the wheel guide (14) between the wheel fork (24) and the wheel carrier unit (16).

15 Claims, 1 Drawing Sheet

(51) Int. Cl.
  *B60K 7/00*   (2006.01)
  *B62D 7/18*   (2006.01)
  *G05D 1/02*   (2020.01)

(52) U.S. Cl.
  CPC ......... *B60G 2500/30* (2013.01); *G05D 1/021* (2013.01)

(56) References Cited

U.S. PATENT DOCUMENTS

| | | | | |
|---|---|---|---|---|
| 8,602,137 | B2* | 12/2013 | Kroese | B60G 11/28 |
| | | | | 180/41 |
| 9,102,331 | B2* | 8/2015 | Bluethmann | B62D 7/026 |
| 10,131,218 | B2* | 11/2018 | Dolgov | B60G 3/145 |
| 10,486,733 | B2* | 11/2019 | Moujoud | B62D 27/04 |
| 10,542,666 | B2* | 1/2020 | Connell | B62D 11/20 |
| 10,730,359 | B2* | 8/2020 | Bittner | A01M 7/0057 |
| 10,807,434 | B2* | 10/2020 | Holt | B60G 11/50 |
| 11,104,197 | B2* | 8/2021 | Stapelbroek Trennepohl | |
| | | | | B60G 17/00 |
| 11,124,231 | B2* | 9/2021 | Hiroe | B62D 7/14 |
| 2011/0024219 | A1* | 2/2011 | Jorgensen | B62D 5/0418 |
| | | | | 475/336 |
| 2014/0091545 | A1* | 4/2014 | Wernli | B62M 1/00 |
| | | | | 280/87.041 |
| 2015/0102571 | A1* | 4/2015 | Slawson | B60G 3/01 |
| | | | | 280/6.157 |
| 2017/0072989 | A1* | 3/2017 | Moujoud | B62D 31/006 |
| 2018/0272824 | A1 | 9/2018 | Kerner et al. | |
| 2018/0272826 | A1 | 9/2018 | Moen | |
| 2019/0248233 | A1* | 8/2019 | Calleija | B60B 37/10 |
| 2020/0276877 | A1* | 9/2020 | Gao | B60K 7/0007 |
| 2021/0114654 | A1* | 4/2021 | Bonk | B62D 51/02 |
| 2021/0122410 | A1* | 4/2021 | Wöllner | B62D 5/0481 |

FOREIGN PATENT DOCUMENTS

| | | |
|---|---|---|
| DE | 19711381 A1 | 9/1998 |
| DE | 202012002846 U1 | 9/2012 |
| DE | 102014206142 A1 | 2/2015 |
| DE | 102014203684 A1 | 9/2015 |
| DE | 102015212580 A1 | 1/2017 |
| DE | 102017109145 B3 | 5/2018 |
| DE | 102017106826 A1 | 8/2018 |
| EP | 3093217 A1 | 11/2016 |

* cited by examiner

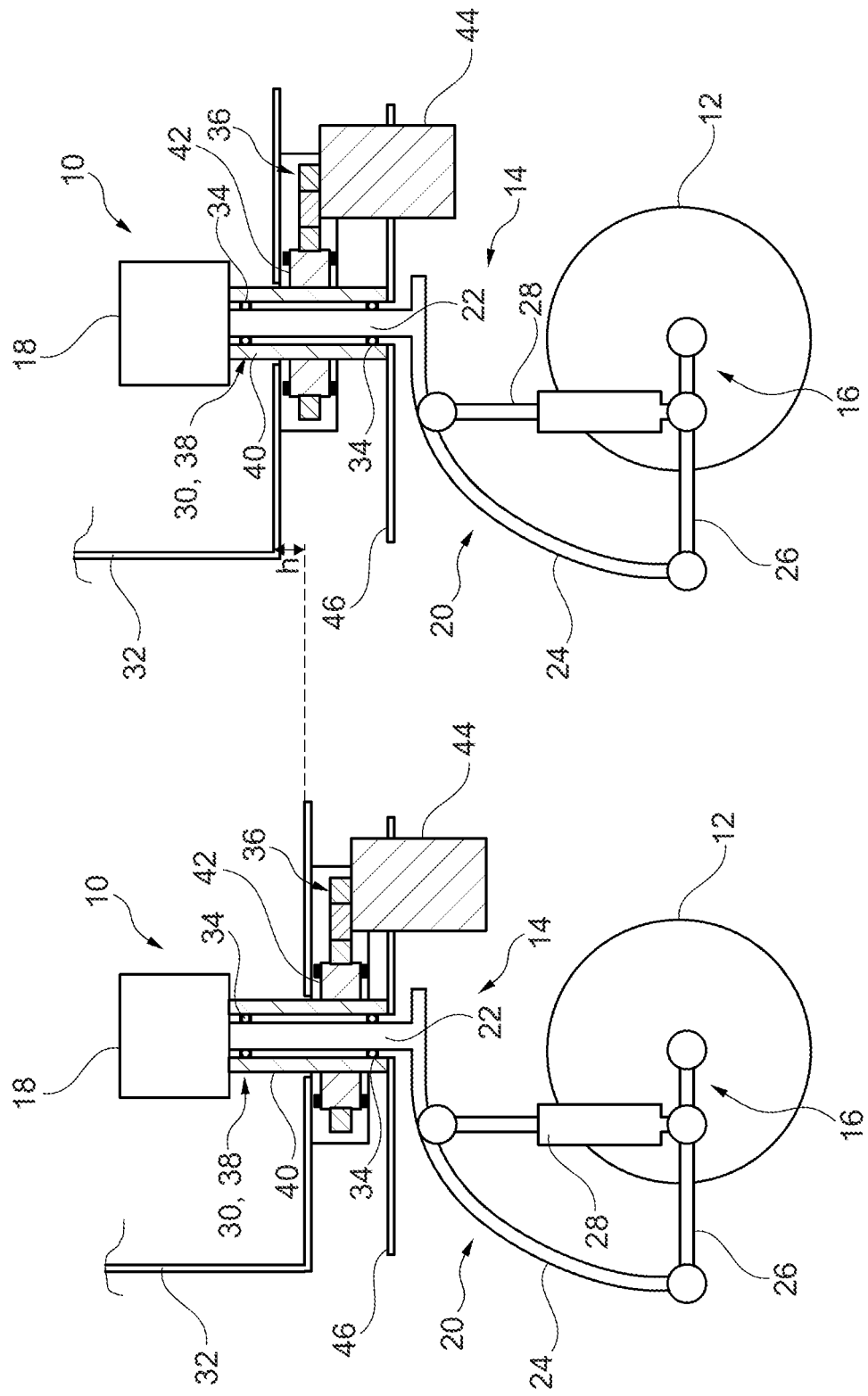

WHEEL MODULE FOR A MOTOR VEHICLE AND CORRESPONDING MOTOR VEHICLE

CROSS-REFERENCE TO RELATED APPLICATIONS

This application is the U.S. National Phase of PCT Appln. No. PCT/DE2019/100964 filed Nov. 8, 2019, which claims priority to DE 10 2018 131 850.2 filed Dec. 12, 2018, the entire disclosures of which are incorporated by reference herein.

TECHNICAL FIELD

The disclosure relates to a wheel module for a motor vehicle, having a wheel and a wheel guide for guiding the wheel, wherein the wheel guide has (i) a wheel carrier unit for supporting the wheel, (ii) a wheel fork supporting the wheel carrier unit, (iii) a steering actuator for adjusting the steering angle of the wheel, (iv) a spring-damper unit and (v) a level adjustment unit for adjusting the height of the vehicle body of the motor vehicle.

BACKGROUND

With the integration of electric drive into individual wheels and the combination of individually driven and steerable wheels (wheel modules), new possibilities arise with regard to vehicle maneuverability in confined spaces. For example, the smallest parking spaces can be used by parking transversely to the direction of travel. This is made possible by the electric actuator for the steering integrated in the wheel module, which enables a steering angle of up to 90° in any direction. In other words, very large steering angles can be implemented via such a wheel module, which can be used for parking, for example. The combination of this extreme mobility with the electric drive means that a wheel module of this type is particularly suitable for motor vehicles that are primarily used in city traffic, including self-driving motor vehicles for city traffic.

An autonomous motor vehicle or self-driving motor vehicle is a motor vehicle that can drive, control and park without the influence of a human driver (highly automated driving or autonomous driving). A special form of the autonomous motor vehicle is the autonomous passenger transport vehicle, which is also referred to as a people mover or autonomous people mover. In this context, autonomous means that none of the people being transported controls the vehicle, but rather that the passenger transport vehicle is self-controlled or automatically controlled. The people transported are usually "only" riders/passengers.

A wheel module of the type mentioned above is known, for example, from DE 10 2017 106 826 A1. This document shows a wheel module for a motor vehicle, having a wheel and a wheel guide for guiding the wheel. The wheel guide itself comprises (i) a wheel carrier unit for supporting the wheel, (ii) a wheel fork supporting the wheel carrier unit, (iii) a steering actuator for adjusting the steering angle of the wheel, (iv) a spring-damper unit (often also referred to as a suspension strut) and (v) a level adjustment unit for adjusting the height of the vehicle body of the motor vehicle, wherein the spring-damper unit and the level adjustment unit are arranged between the wheel fork and the steering actuator. The spring-damper unit and the level adjustment unit form a compact overall module. A connection to the structure/vehicle body is made via strut bearings. The document also shows a motor vehicle having four wheel modules of this type.

With such a structure of the wheel module, the following challenges arise:

1. when designing the shock absorber and suspension spring of the spring-damper unit, additional installation space must be taken into account for the level adjustment unit: the freedom of design when designing the characteristic curves is limited.
2. when making changes to the chassis and vehicle equipment without a level adjustment unit, a complete redesign of the spring-damper unit, i.e., the spring/shock absorber unit, is required.
3. the function of the spring-damper unit is impaired by inertia, weight (unsprung mass) and the effect of the adjustment unit.

SUMMARY

It is desirable to provide a wheel module and a corresponding motor vehicle in which the freedom of design is increased and the functionality is improved and/or expanded.

A wheel module for a motor vehicle has a wheel and a wheel guide for guiding the wheel, in which the wheel guide has (i) a wheel carrier unit for supporting the wheel, (ii) a wheel fork supporting the wheel carrier unit, (iii) a steering actuator for adjusting the steering angle of the wheel, (iv) a spring-damper unit and (v) a level adjustment unit for adjusting the height of the vehicle body of the motor vehicle. The spring-damper unit is arranged in a region of the wheel guide between the wheel fork and the wheel carrier unit. In this way, the steering actuator is decoupled from the spring-damper unit and can be arranged between the rest of the wheel module and the vehicle frame. This prevents the components from influencing one another. This results in an increased freedom of design and an improvement and expansion of the functionality of the wheel module.

The wheel guide may have a rocker arm between the wheel fork and the wheel carrier unit, wherein the spring-damper unit is arranged in an articulated manner between the wheel fork and the rocker arm.

The level adjustment unit may form a supporting device for supporting the wheel module on a vehicle body of the motor vehicle. In this way, a height regulation of the vehicle body is possible in the corresponding motor vehicle.

The level adjustment unit may have a spindle drive with a threaded spindle and a threaded nut. A spindle drive of this type is robust and can be implemented relatively easily.

The threaded spindle may be designed as a hollow threaded spindle in which a steering axle is supported for rotating the wheel fork by means of the steering actuator. The steering actuator sets the steering angle via this steering axle.

Furthermore, the level adjustment unit may have an auxiliary frame connected to the threaded spindle in a rotationally fixed manner.

The level adjustment unit may have an electric drive unit as a drive. This drive unit is then in particular fastened to said auxiliary frame. Components of the drive unit may include an electric motor and a transmission connected downstream of the electric motor.

The wheel carrier unit may have a braking device and/or a drive machine. The braking device may be configured in particular as a drum brake or a disk brake. The drive machine may be designed as a wheel hub motor.

A motor vehicle may have one or a plurality of wheel modules of this type. The motor vehicle may be a self-driving motor vehicle.

The motor vehicle may be designed as an autonomous passenger transport vehicle. An autonomous passenger transport vehicle is also known as an (autonomous) people mover. In this context, autonomous means that none of the people being transported controls the vehicle, but rather that the passenger transport vehicle is self-controlled or automatically controlled.

BRIEF DESCRIPTION OF THE DRAWINGS

In the following, the wheel module is explained by way of example with reference to the attached drawings using a preferred exemplary embodiment, wherein the features shown below can be present both individually and in combination, wherein:

The single FIGURE shows a wheel module for a motor vehicle with two different height settings for the height of the vehicle body.

DETAILED DESCRIPTION

The single FIGURE shows a wheel module 10 for a motor vehicle, for example a self-driving motor vehicle such as what is termed a people mover. In addition to a wheel 12, this wheel module 10 comprises a wheel guide 14 for guiding the wheel 12. The wheel guide 14 has three main components. A wheel carrier unit 16 for supporting the wheel 12, a steering actuator 18 for adjusting the steering angle of the wheel 12 and a central part 20 with a steering axle 22, a wheel fork 24, a rocker arm 26 and a spring-damper unit 28. The spring-damper unit 28 is sometimes also referred to as a suspension strut and comprises a spring and a damper (not shown in detail). The rocker arm 26 is arranged between the wheel fork 24 and the wheel carrier unit 16, wherein the spring-damper unit 28 is arranged in an articulated manner between the wheel fork 24 and the rocker arm 26. A structure of this type is known, for example, as the classic structure of a motorcycle front wheel.

A rotation of the wheel fork 24 for steering by means of the steering actuator 18 takes place via the steering axle 22. For this purpose, the steering axle 22 is rotatably supported in a supporting device 30, via which the wheel module 10 is fastened to a vehicle body 32 of the motor vehicle. The supporting takes place via a bearing 34.

The supporting device 30 for supporting the wheel module 10 is formed by a level adjustment unit 36 of the wheel module 10. This level adjustment unit 36 has a spindle drive 38 with a threaded spindle 40 and a threaded nut 42. In this way, a height regulation of the vehicle body 32 is possible in the motor vehicle. The threaded spindle 40 is designed as a hollow threaded spindle 40 in which a steering axle 22 is supported for rotating the wheel fork 24 by means of the steering actuator 18. In other words, the steering actuator 18 sets the steering angle via this steering axle 22.

The level adjustment unit 36 also has an electric drive unit 44 and an auxiliary frame 46 that is connected to the threaded spindle 40 in a rotationally fixed manner. The spindle drive 38 is a type of transmission of the level adjustment unit 36, which is connected downstream of the electric drive unit 44. The drive unit is fastened to said auxiliary frame 46.

FIG. 1 shows the wheel module 10 on the left and right with two different height settings of the height of the vehicle body 32. The difference in height is the lift h.

In the following, important aspects of the wheel module structure and its function will be described again in other words:

The wheel module 10 consists of the vehicle wheel 12, which is articulated to the wheel fork 24 via the rocker arm 26. The articulated spring-damper unit 28 is located between the fork 24 and the rocker arm 26 and enables the wheel lift movement of the wheel 12 with the articulated rocker arm 26. The wheel fork 24 is at least indirectly connected to the steering actuator 18, namely via the steering axle 22, and is at least indirectly connected to the auxiliary frame 46 via a bearing unit formed by the bearings 34 and the threaded spindle 40.

The spring-damper unit 28 is thus arranged in a region of the wheel guide 14 between the wheel fork 24 and the wheel carrier unit 16. In this way, the steering actuator 18 is no longer directly coupled to the spring-damper unit 28 and can be arranged between the rest of the wheel module 10 and the vehicle frame of the motor vehicle. This prevents the components from influencing one another. This results in an increased freedom of design and an improvement and expansion of the functionality of the wheel module.

In the embodiment shown, a hollow threaded spindle 40 is connected to the auxiliary frame 46 and the bearing unit, namely the bearings 34, of the wheel fork 24 is integrated in the threaded spindle 40. As mentioned above, the threaded spindle 40 is connected to the auxiliary frame 46 in a rotationally fixed manner. The vehicle body 32 is connected to the auxiliary frame 46 via the level adjustment unit 36. The level adjustment unit 36 comprises the drive unit 44 with motor and gear unit, which drives the threaded nut 42 in rotation. The threaded nut 42 is supported in relation to a housing unit of the level adjustment unit 36 via roller bearings.

The level adjustment is realized in that the electric motor of the drive unit drives the transmission, whereby the threaded nut 42 is rotated. The threaded nut 42 is in engagement with the threaded spindle 40, whereby the rotational movement is converted into a linear movement. In this way, any vehicle level can be set within the available spindle length. A ball screw drive is particularly preferably used as the linear drive, whereby a locking of the height level reached is required. Actuators having a lock of this type are described in the prior art.

LIST OF REFERENCE SYMBOLS

10 Wheel module
12 Wheel
14 Wheel guide
16 Wheel carrier unit
18 Steering actuator
20 Central part
22 Steering axle
24 Wheel fork
26 Rocker arm
28 Spring-damper unit
30 Supporting device
32 Vehicle body
34 Bearing
36 Level adjustment unit
38 Spindle drive
40 Threaded spindle
42 Threaded nut
44 Electric drive unit
46 Auxiliary frame
h Lift

The invention claimed is:

1. A wheel module for a motor vehicle, the wheel module having a wheel and a wheel guide for guiding the wheel, the wheel guide having
   a wheel carrier unit for supporting the wheel,
   a wheel fork supporting the wheel carrier unit,
   a steering actuator for adjusting a steering angle of the wheel,
   a spring-damper unit,
   a level adjustment unit configured for adjusting a height of a vehicle body of the motor vehicle, and
   a rocker arm arranged between the wheel fork and the wheel carrier unit, and wherein:
      the spring-damper unit is arranged in a region of the wheel guide between the wheel fork and the wheel carrier unit, and
      the spring-damper unit is arranged in an articulated manner between the wheel fork and the rocker arm.

2. The wheel module according to claim 1, wherein the level adjustment unit forms a supporting device for supporting the wheel module on a vehicle body of the motor vehicle.

3. The wheel module according to claim 1, wherein the level adjustment unit has a spindle drive having a threaded spindle and a threaded nut.

4. The wheel module according to claim 3, wherein the threaded spindle is designed as a hollow threaded spindle in which a steering axle is supported for transmitting a rotary movement from the steering actuator to the wheel fork.

5. The wheel module according to claim 3, wherein the level adjustment unit has an auxiliary frame connected to the threaded spindle in a rotationally fixed manner.

6. The wheel module according to claim 5, wherein the level adjustment unit has an electric drive unit as a drive, which is fastened to the auxiliary frame.

7. A motor vehicle having one or more wheel modules according to claim 1.

8. The motor vehicle according to claim 7, wherein the motor vehicle is an autonomous passenger transport vehicle.

9. The motor vehicle according to claim 7 wherein the motor vehicle is a self-driving motor vehicle.

10. A wheel guide comprising:
    a wheel carrier unit configured for supporting a wheel;
    a wheel fork supporting the wheel carrier unit;
    a steering actuator configured for adjusting a steering angle of the wheel;
    a spring-damper unit arranged between the wheel fork and the wheel carrier unit;
    a level adjustment unit configured for adjusting a height of a vehicle body of a motor vehicle; and
    a rocker arm arranged between the wheel fork and the wheel carrier unit; and
    the spring-damper unit is arranged in an articulated manner between the wheel fork and the rocker arm.

11. The wheel guide according to claim 10, wherein the level adjustment unit has a spindle drive having a threaded spindle and a threaded nut and forms a supporting device configured for supporting a wheel module on the vehicle body of the motor vehicle.

12. The wheel guide according to claim 11, wherein the threaded spindle is designed as a hollow threaded spindle in which a steering axle is supported for transmitting a rotary movement from the steering actuator to the wheel fork.

13. The wheel guide according to claim 11, wherein the level adjustment unit has an auxiliary frame connected to the threaded spindle in a rotationally fixed manner.

14. The wheel guide according to claim 13, wherein the level adjustment unit has an electric drive unit as a drive, which is fastened to the auxiliary frame.

15. A wheel guide comprising:
    a wheel carrier unit configured for supporting a wheel;
    a wheel fork supporting the wheel carrier unit;
    a steering actuator configured for adjusting a steering angle of the wheel;
    a spring-damper unit arranged between the wheel fork and the wheel carrier unit; and
    a level adjustment unit configured for adjusting a height of a vehicle body of a motor vehicle, the level adjustment unit having a threaded spindle and a threaded nut and forms a supporting device configured for supporting a wheel module on the vehicle body of the motor vehicle.

* * * * *